United States Patent [19]

Ampian

[11] Patent Number: 5,207,755
[45] Date of Patent: May 4, 1993

[54] UNIVERSALLY ADJUSTABLE PAINT ROLLER

[76] Inventor: Gregory J. Ampian, 3201 Castleleigh Rd., Beltsville, Md. 20705

[21] Appl. No.: 885,891

[22] Filed: May 20, 1992

[51] Int. Cl.$^5$ .............................................. B05C 17/02
[52] U.S. Cl. .................. 15/230.11; 15/144.1; 15/144.2; 15/172; 403/96; 403/97; 492/13
[58] Field of Search ............... 15/144.1, 144.2, 172, 15/230.11; 29/110.5; 403/96, 97

[56] References Cited

U.S. PATENT DOCUMENTS

| | | | |
|---|---|---|---|
| 579,277 | 3/1897 | Lord et al. | 403/96 |
| 613,673 | 11/1898 | Fredrick | 403/97 |
| 1,649,951 | 11/1927 | English | 403/96 |
| 1,651,251 | 11/1927 | Calkins | 15/172 |
| 2,098,348 | 11/1937 | Mason et al. | 403/97 |
| 2,361,853 | 10/1944 | Lundquist | 403/97 |
| 2,796,619 | 6/1957 | Hammer | 15/172 |
| 2,817,107 | 12/1957 | Zellinger . | |
| 2,922,669 | 1/1960 | Hansen | 403/96 |
| 3,027,582 | 4/1962 | Pittman . | |
| 3,044,094 | 7/1962 | Ecker . | |
| 3,205,522 | 9/1965 | Then | 15/144.2 |
| 3,273,192 | 9/1966 | Mazzella . | |
| 3,357,035 | 12/1967 | Ficke | 15/144.1 |
| 3,408,676 | 11/1968 | Cayo . | |
| 3,419,931 | 1/1969 | Willig . | |
| 3,866,257 | 2/1975 | Cansdale, Sr. . | |
| 4,038,716 | 8/1977 | Polsfuss . | |
| 4,089,082 | 5/1978 | McGrew . | |
| 4,196,491 | 4/1980 | Baril . | |
| 4,528,714 | 7/1985 | Beck . | |
| 4,582,445 | 4/1986 | Warshawsky | 403/97 |
| 4,890,950 | 1/1990 | Yoo | 403/96 |
| 5,050,261 | 9/1991 | Hofacker . | |

FOREIGN PATENT DOCUMENTS

| | | | |
|---|---|---|---|
| 525941 | 2/1954 | Belgium | 15/230.11 |
| 529257 | 8/1956 | Canada | 15/172 |
| 796002 | 10/1968 | Canada | 15/144.2 |
| 534114 | 9/1931 | Fed. Rep. of Germany | 15/172 |
| 509628 | 1/1956 | Fed. Rep. of Germany | 15/144.2 |
| 2510150 | 5/1976 | Fed. Rep. of Germany | 15/144.1 |
| 1122972 | 9/1956 | France | 15/144.1 |
| 136108 | 6/1979 | German Democratic Rep. | 15/230.11 |
| 50937 | 2/1910 | Switzerland | 15/172 |
| 243821 | 1/1947 | Switzerland | 15/144.1 |
| 21679 | of 1913 | United Kingdom | 403/96 |

Primary Examiner—Harvey C. Hornsby
Assistant Examiner—Mark Spisich
Attorney, Agent, or Firm—Sughrue, Mion, Zinn, Macpeak & Seas

[57] ABSTRACT

A universally adjustable paint roller in which the roller may be adjusted about three orthogonally disposed axes. The paint roller includes a roller head; a support arm having first and second ends with the roller head being rotatably supported on the first end; a handle for allowing a user to hold the paint roller; and a universal rotating mechanism for rotatably securing the support arm to the handle such that the roller head can be rotated with respect to the handle about three independent axes disposed orthogonally with respect to one another to enable the roller head to be universally adjustable, wherein the roller head is rotatable 360° about at least two of the axes. The paint roller further includes lock mechanisms for locking the rotating mechanism in a desired position.

10 Claims, 2 Drawing Sheets

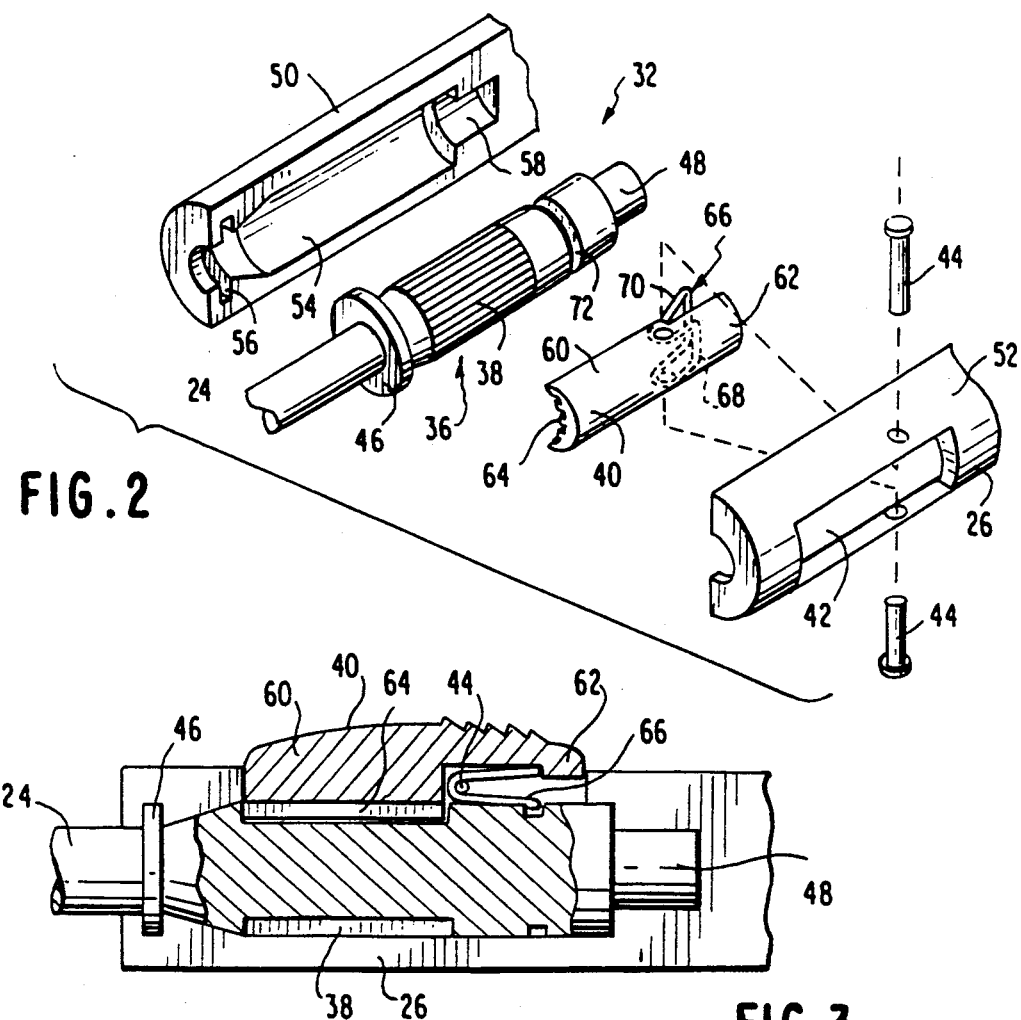
FIG.2
FIG.3
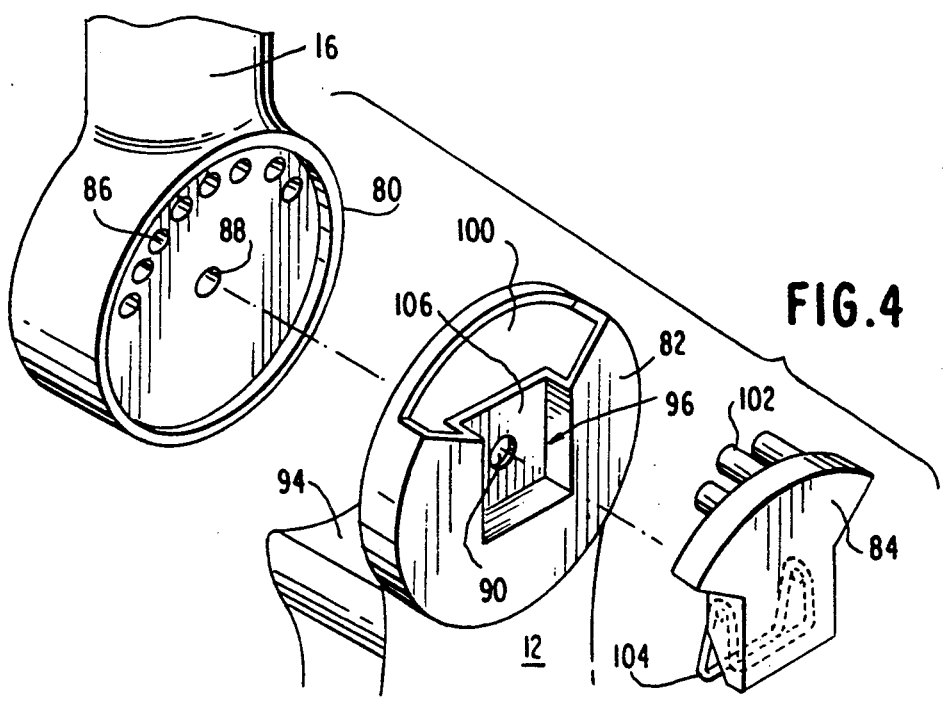
FIG.4

UNIVERSALLY ADJUSTABLE PAINT ROLLER

BACKGROUND OF THE INVENTION

Field of the Invention

This invention relates to a paint roller and, in particular, to a paint roller that is universally adjustable.

Background of the Invention

The art has made some progress in the use of paint rollers that are angularly adjustable. For example, U.S. Pat. No. 4,196,491 is directed to a paint roller which can be angularly adjusted about two perpendicularly disposed axes. Further, U.S. Pat. No. 3,866,257 is directed to a paint roller which includes a swivel joint to allow angular adjustment of the roller head with respect to the handle.

However, each of these arrangements has disadvantages which makes each of them difficult to operate. For example, the paint roller disclosed in the former patent has limited angular adjustability since it can only be adjusted about one axis. As a result, the use of the paint roller is generally limited to painting unobstructed walls or ceilings. Specifically, in the normal course of painting, there are situations where there is limited access space requiring a specific angular orientation between the roller and the handle which cannot be achieved by the paint roller disclosed in the '491 patent. Therefore, the painter would be forced to use a brush, or the like. While the paint roller disclosed in the '257 patent is adjustable with three degrees of freedom, such adjustability is limited to a specific range of movement and, therefore, the paint roller of the '257 patent likewise experiences the disadvantages regarding limited adjustability.

Another disadvantage of conventional paint rollers, such as that disclosed in the '192 patent, is that they rely on a bolt and wing nut arrangement for locking the paint roller in a desired angularly adjusted position. This arrangement has clear disadvantages as loosening and tightening a wing nut is awkward and time consuming. Further, it is apparent that in the course of usage the wing nut can loosen and fall off. The use of a swivel joint arrangement, such as that disclosed in the '257 patent, is impractical in that there does not appear to be a mechanism for locking the paint roller once the proper adjustment has been made.

SUMMARY OF THE INVENTION

Taking cognizance of the problems encountered with the adjustable paint rollers of the prior art, this invention provides a unique solution. Basically, a paint roller has been developed which makes two improvements. One of these is in the design of the mode of adjustment. Instead of the bolt and wing nut, a release/lock button is used. The roller head can thus be adjusted to the desired position quickly with just one hand by simply pushing the button. As the button is released, a tension spring forces the mating end of the button onto a corresponding mating shaft, securing the unit in place. More fundamental is the type of adjustment that can be made. Unlike the adjustable rollers of the prior art, this paint roller is adapted to pivot about three orthogonally disposed axes such that the roller head can assume almost any conceivable angular position with respect to the handle.

A first embodiment of the invention is directed to a universally adjustable paint roller, comprising a roller head; a support arm having first and second ends with the roller head being rotatably supported on the first end; a handle for allowing a user to hold the paint roller; a universal rotating mechanism for rotatably securing the support arm to the handle, the rotating mechanism being rotatable about three independent axes disposed orthogonally with respect to one another to enable the roller head to be universally adjustable; and a lock mechanism for locking the rotating mechanism in a desired position.

The rotating mechanism comprises a first L-shaped coupling member having a first end extending along a first axis and a second end extending along a second axis with the second end of the support arm being rotatably coupled to the first end of the first coupling member so as to be rotatable about the first axis; and a second coupling member having first and second ends, the first end being rotatably coupled to the second end of the first coupling member such that the first coupling member is rotatable about the second axis, the second end of the second coupling member being rotatably coupled to the handle so as to rotatable about a third axis.

The lock mechanism comprises a first locking mechanism for locking the second end of the support arm to the first end of the second coupling member; a second locking mechanism for locking the second end of the first coupling member to the first end of the second coupling member; and a third locking mechanism for locking the second end of the second coupling member to the handle.

A second embodiment of the invention is directed to a specific locking mechanism for rotatably locking a first and second shaft to each other. Such a locking mechanism comprises a tubular shaft member connected to an end of the first shaft and having a hollowed portion with an opening provide in a wall thereof; a splined shaft fixedly secured to an end of the second shaft and rotatably positioned within the hollowed portion of the tubular shaft member; and a locking member pivotally supported within the opening of the tubular shaft member. The locking member includes a locking portion at one end thereof and an engaging portion at the other end thereof and is pivotally supported at a position between the locking portion and the engaging portion. The locking portion has an arcuate shaped inner surface having a plurality of teeth disposed thereon extending in the same direction as the teeth of the spline so as to be engageable therewith. A spring is provided for urging the locking portion into engagement with the splined shaft so as to prevent the splined shaft, and attendantly the second shaft, from rotating with respect to the first shaft.

A third embodiment is directed to another type of locking mechanism for rotatably locking first and second shafts to each other. This locking mechanism comprises a disc-shaped lock receiving member fixedly attached to an end of the first shaft and positioned such that opposite planar sides face in the direction of an axis about which the shafts are rotatable, the lock receiving member having a plurality of peg receiving holes provided around the periphery thereof at a predetermined radius; a lock supporting member fixedly secured to an end of the second shaft; and a pivot pin pivotally securing the lock receiving member to the lock supporting member and attendantly pivotally securing the first shaft with the second shaft. Additionally, a lock member is pivotally secured to the lock supporting member and includes a locking portion at one end thereof and a thumb engaging portion at the other end thereof with the pivot axis being disposed therebetween, and at least one peg extending from the locking portion so as to be engageable with the peg receiving holes. Finally, a spring urges the peg toward the lock receiving member such that the at least one peg can be locked in one of the peg receiving holes.

BRIEF DESCRIPTION OF THE DRAWING

FIG. 2 is a perspective exploded view of one of the adjustment elements of this assembly;

FIG. 3 is a sectional view of the adjustment element shown in FIG. 2;

FIG. 4 is a perspective exploded view of another of the adjustment elements of this assembly; and FIG. 5 is a sectional view of the adjustment element shown in FIG. 4.

DETAILED DESCRIPTION OF PREFERRED EMBODIMENT

Figure 1:
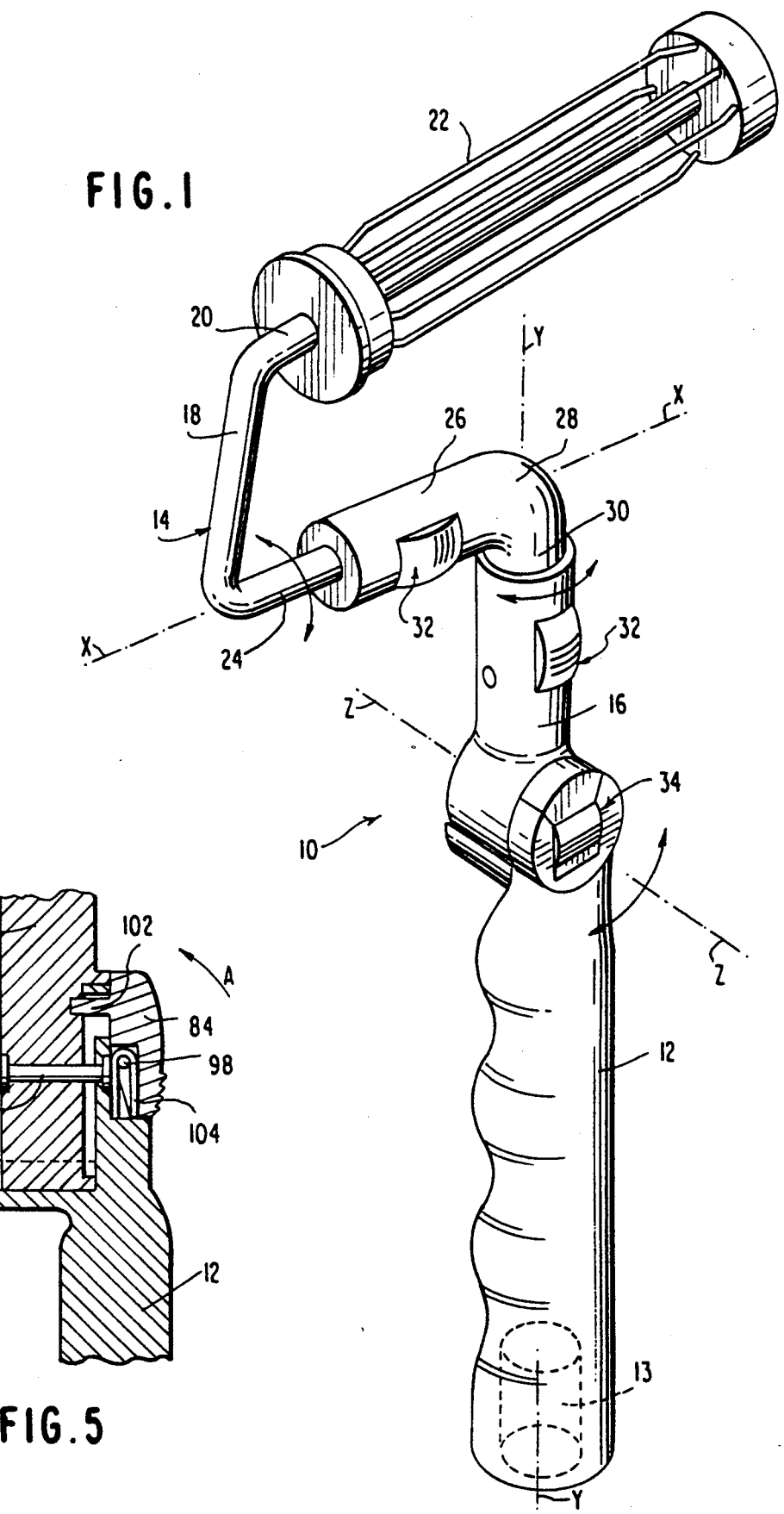
FIG. 1 is a perspective view of the paint roller assembly.

Referring to FIG. 1, the adjustable paint roller 10 of the present invention includes a handle 12, a U-shaped roller support mechanism 14, an elbow member 28 and a coupling member 16. The roller support mechanism includes a U-shaped support arm 18 including a spindle 20, forming one leg of the U-shaped support arm, to which a roller head 22 is rotatably supported and a base arm 24, forming the other leg of the support arm. The base arm 24 is rotatably attached to an upper elbow leg 26 of elbow 28 so that it can be rotated 360° about axis x—x. The other, lower elbow leg 30 of the elbow is rotatably secured to the upper end of coupling member 16 so that it can be rotated 360° about axis y—y. Finally, the lower end of the coupling member is rotatably secured to the handle 12 so that it can be rotated about the axis z—z. The handle includes a threaded bend hole 13 to allow and extension to be secured thereto as desired. Accordingly, it can be understood that the adjustable paint roller according to the present invention is adjustable about 3 axes (axis x—x; axis y—y; and axis z—z) enabling the roller head 22 to be arranged at any desired angle with respect to the handle 12. Additionally, the paint roller can be rotated a full 360° about the y—y axis; 270° about the z—z axis; and 180° about the x—x axis. Thus, the paint roller can be adjusted to substantially any desired position as the circumstances may dictate.

There are two types of lock mechanisms for locking the paint roller in the desired position. In particular, an upper lock mechanisms 32 locks the U-shaped roller support mechanism 14 to the elbow upper elbow leg 26 and locks the lower elbow leg 30 to the coupling member 16. A lower lock mechanism 34 locks the coupling member 16 to the handle 12. Each of these lock mechanism is described below.

The upper lock mechanism 32 is illustrated in FIGS. 2 and 3. Referring thereto, the lock mechanism 32 includes a nipple 36, having a splined portion 38, attached to the end of base arm 24 and a substantially L-shaped locking member 40 pivotally disposed within an opening 42 formed in the upper elbow leg 26 utilizing pivot pin 44. In more detail, the nipple 36 includes a disc-shaped portion 46, the splined portion 38 and a bearing portion 48. The elbow 22 is formed as two half portions 50, 52 to enable the nipple 36 to be positioned within a cavity 54 defined by the two half portions. The disc-shaped portion 46 of the nipple is received in a slotted cavity 56 to prevent the nipple 36 from moving longitudinally within the cavity 54. Additionally, the bearing portion 48 is received in bearing cavity 58 defined by the two half portions 50, 52 of the upper elbow leg 26, as illustrated in FIG. 3, to enable rotation of the nipple with respect to the elbow 22.

The locking member 40 includes a front half portion 60 and a rear half portion 62. The front half portion 60 includes an arcuate inner surface having longitudinally extending teeth 64 provided thereon. A spring 66 is secured at a mid-portion thereof to the pivot pin 44 and includes opposite end portions 68, 70. One end 70 of the spring 66 is received in a recessed portion 72 of the nipple and the other end 68 of the spring abuts against the rear half portion 62 of the locking member 40 so as to urge the rear half portion 62 away from the nipple 36 and, attendantly, urge the front half portion 60 of the locking member toward the nipple 36 so that the teeth 64 of the locking member engage the teeth of the splined portion 38. As a result, the nipple 36 and, hence the roller support 14, is prevented from rotating with respect to the elbow 22. To disengaged the teeth 64 of the locking member 40 from the teeth of the splined portion, the user simply pushes against the rear half portion 62 of the locking member 40 causing the front half portion 60 to pivot away from the splined portion of the nipple 36.

The same locking mechanism is used for preventing rotational movement of the lower elbow leg 30 with respect to the coupling member 16. In this case, the nipple 36 is connected to the end of the lower elbow leg 30 and is received in the upper portion of the coupling member 16. Further, the locking member 40 is pivotally secured in an opening provided in the coupling member in the same manner as the locking member 40 is pivotally supported in the opening of elbow 22. Due to the engagement of the teeth of the locking member with the teeth of the splined portion, rotation of the elbow 22 with respect to the coupling member 16 is prevented. On the other hand, the locking member can be easily disengaged from the splined shaft by pushing the rear half portion 62 of the locking member with one's thumb.

The lower locking mechanism 34 for locking the coupling member 16 to the handle 12 is illustrated in detail in FIGS. 4 and 5. Referring thereto, the lower locking mechanism includes a disc-shaped lock receiving member 80 attached to the lower end of the coupling member 16, a disc-shaped lock supporting member 82 attached to the top of the handle 12 and a lock engaging member 84, as illustrated. The lock receiving member 80 includes a plurality of peg receiving holes 86 extending parallel to the longitudinal axis of the lock receiving member 80, as illustrated in FIG. 4. The holes 86 are positioned a predetermined radial distance from the center of the lock receiving member and cover an arc of approximately 270°, corresponding to the desired degree of angular adjustment of the coupling member 16 with respect to the handle 12. Additionally, the lock receiving member 80 and the lock supporting member 82 respectively have a center holes 88 and 90 into which is disposed a pivot pin 92 pivotally coupling the coupling member to the handle, as best illustrated in FIG. 5. It is noted that any conventional manner of pivotally connecting the lock receiving member 80 to the lock supporting member would suffice. An arcuate bearing surface 94 is provided on the lock supporting member 82 to assist in supporting the lock receiving member 80, as illustrated in FIG. 4.

The lock engaging member 84 is pivotally secured in a fan-shaped recess 96 provided in the lock supporting member 82 using a pivot pin 98. The upper portion of the recess defines an opening 100. The lock engaging member 84 is likewise fan-shaped including a plurality of positioning pegs 102 extending therefrom at the same radial distance from the pivot pin 92 as the peg receiving holes 86. It is preferable that the pegs have a truncated cone shape. Due to the opening 100 in the lock supporting member 80, the positioning pegs 102 can engage the appropriate peg receiving holes to rotatably lock the coupling member 16 to the handle 12. To maintain engagement of the positioning pegs 102 in the appropriate holes, a spring 104 is interposed between the lower half of the lock engaging member 84 and the inner wall 106 of the recess causing the lock engaging member 84 to rotate in the counter-clockwise direction, as illustrated by arrow A in FIG. 5. While the preferred embodiment includes three pegs, it is of course understood that the invention is not to be limited thereby. For example any desired number of pegs may be used including just a single peg so long as it has the necessary strength.

While the invention has been described in connection with the preferred embodiments of the invention, it is understood that various changes and modifications may be made therein without departing from the invention, and it is the intention to cover in the appended claims all such changes and modifications as fall within the true spirit and scope of the invention.

I claim:

1. A universally adjustable paint roller, comprising:
 a roller head;
 a support arm having first and second ends, said roller head being rotatably supported on said first end;
 a handle for allowing a user to hold said paint roller;
 universal rotating means for rotatably securing said support arm to said handle, said rotating means being rotatable about three independent axes disposed orthogonally with respect to one another to enable said roller head to be universally adjustable; and
 lock means for locking said rotating means in a desired position, wherein said rotating means comprises:
 a first L-shaped coupling member having a first end extending along a first axis of said axes and a second end extending along a second axis of said axes, said second end of said support arm being rotatably coupled to said first end of said first coupling member so as to be rotatable about said first axis; and
 a second coupling member having first and second ends, said first end of said second coupling member being rotatably coupled to said second end of said first coupling member such that said first coupling member is rotatable about said second axis, said second end of said second coupling member being rotatably coupled to said handle so as to rotatable about a third axis of said axes.

2. The paint roller of claim 1, wherein said lock means comprises:
 first locking means for locking said second end of said support arm to said first end of said second coupling member;
 second locking means for locking said second end of said first coupling member to said first end of said second coupling member; and
 third locking means for locking said second end of said second coupling member to said handle.

3. The paint roller of claim 2, wherein said first end of said first coupling member is tubular in shape so as to define a cylindrical hollowed portion therein and has an opening in a wall thereof, and wherein said first locking means comprises:
 a splined shaft fixedly secured to said first end of said support arm and positioned within said hollowed portion of said first end of said first coupling member;
 a locking member pivotally supported within said opening, said locking member having a locking portion at one end thereof and an engaging portion at the other end thereof and being pivotally supported at a position between said locking portion and said engaging portion, said locking portion having an arcuate shaped inner surface having a plurality of teeth disposed thereon extending in the direction of said first axis so as to be engageable with the teeth of said splined shaft; and
 a spring for urging said teeth of said locking portion into engagement with said splined shaft so as to prevent said splined shaft, and attendantly said support arm, from rotating with respect to said first coupling member.

4. The paint roller of claim 3, wherein said spring is interposed between an outer surface of said first arm of said first coupling member and said engaging portion of said locking member.

5. The paint roller of claim 2, wherein said first end of said second coupling member is tubular in shape so as to define a cylindrical hollowed portion therein and has an opening in a wall thereof, and wherein said second locking means comprises:
 a splined shaft fixedly secured to said second end of said first coupling member and positioned within said hollowed portion of said first end of said second coupling member;
 a locking member pivotally supported within said opening, said locking member having a locking portion at one end thereof and an engaging portion at the other end thereof and being pivotally supported at a position between said locking portion and said engaging portion, said locking portion having an arcuate shaped inner surface having a plurality of teeth disposed thereon extending in the direction of said second axis so as to be engageable with the teeth of said splined shaft; and
 a spring for urging said locking portion into engagement with said splined shaft so as to prevent said splined shaft, and attendantly said first coupling member, from rotating with respect to said second coupling member.

6. The paint roller of claim 5, wherein said spring is interposed between an outer surface of said first arm of said second coupling member and said engaging portion of said locking member.

7. The paint roller of claim 2, wherein said third locking means comprises:
 a disc-shaped lock receiving member fixedly attached to said second end of said second coupling member and positioned such that opposite planar sides face in the direction of said third axis, said lock receiving member having a plurality of peg receiving holes provided therein spaced from each other and arranged around an arc at a predetermined radius from a center of said lock-receiving member;

a lock supporting member fixedly secured to one end of said handle;

a pivot pin pivotally securing said lock receiving member to said lock supporting member;

a lock member pivotally secured to said lock supporting member so as to be pivotable about a pivot axis disposed parallel to said first axis, said lock member including a locking portion at one end thereof and a thumb engaging portion at the other end thereof with said pivot axis being disposed therebetween, and at least one peg extending from said locking portion in a direction parallel to said third axis; and spring means for causing said peg to pivot toward said lock receiving member such that said at least one peg can be locked in one of said peg receiving holes.

8. The paint roller of claim 7, wherein said spring means comprises a spring interposed between said thumb engaging portion of said locking member and an outer surface of said lock supporting member.

9. The paint roller of claim 7, wherein said lock supporting member has a recess therein for receiving at least a portion of said locking member.

10. The paint roller of claim 7, wherein said locking member has a plurality of pegs disposed thereon insertable into a corresponding plurality of said peg engaging holes.

* * * * *